FIG. I.

PATH SWITCHING BLOCK DIAGRAM

Inventors
ESMOND P. G. WRIGHT
ALEXANDER D. ODELL

Sept. 4, 1956 E. P. G. WRIGHT ET AL 2,761,621
ELECTRIC CALCULATING CIRCUITS
Filed Nov. 24, 1950 11 Sheets-Sheet 4

Inventors
ESMOND P. G. WRIGHT
ALEXANDER D. ODELL

By Robert Harding Jr.
Attorney

TRANSLATING NETWORK

|   | Relays |   |   | Borrow | Carry |
|---|---|---|---|---|---|
| A | B | C | Write | Subtraction | Addition |
| X | O | O | X | X | O |
| O | X | O | X | O | O |
| O | O | X | X | X | O |
| X | X | O | O | O | X |
| X | O | X | O | X | X |
| O | X | X | O | O | X |
| X | X | X | X | X | X |
| O | O | O | O | O | O |

X = Relay Operated
O = Undisturbed Condition

X = Triggering Pulse Output

OPERATION OF TRANSLATING NETWORK (FIG. 5.)

Sept. 4, 1956     E. P. G. WRIGHT ET AL     2,761,621
ELECTRIC CALCULATING CIRCUITS
Filed Nov. 24, 1950     11 Sheets-Sheet 8
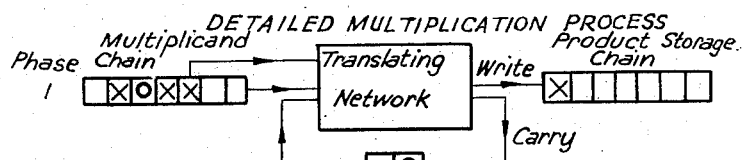
FIG. 9.
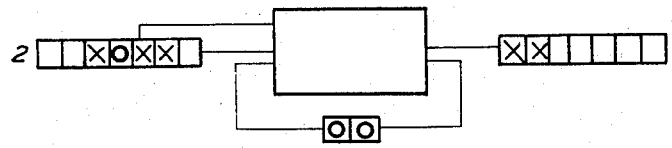
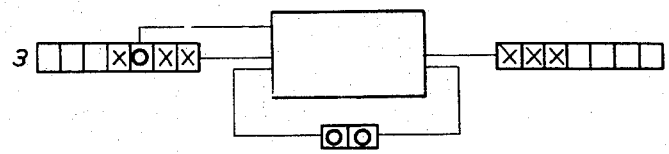
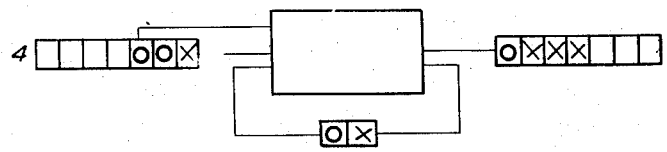
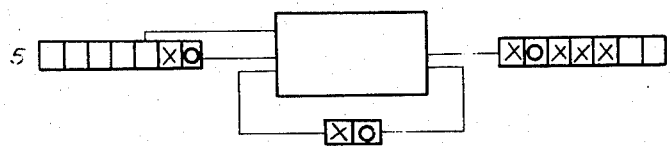
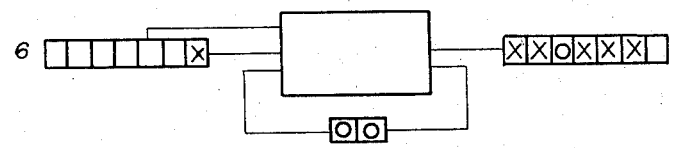
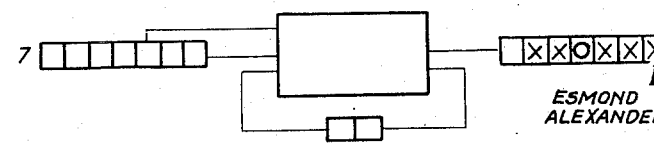
*Inventors*
ESMOND P. G. WRIGHT
ALEXANDER D. ODELL
By *Robert Hardingh*
                 *Attorney*

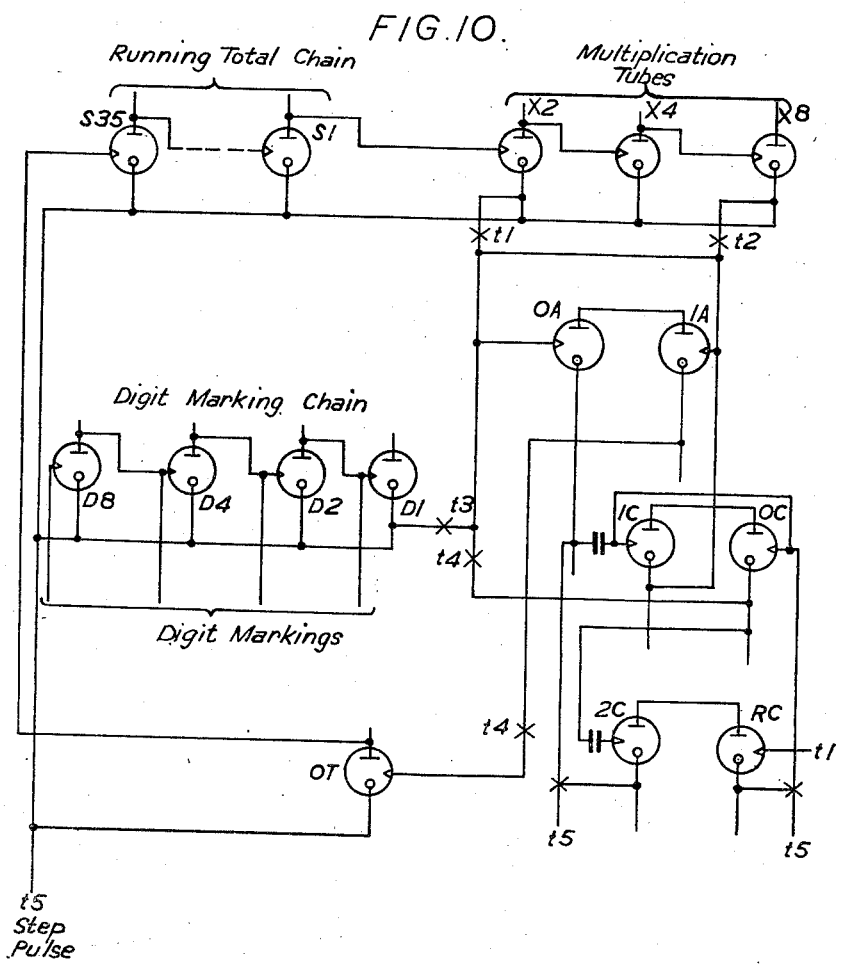

Digit Markings.

United States Patent Office 2,761,621
Patented Sept. 4, 1956

2,761,621

ELECTRIC CALCULATING CIRCUITS

Esmond Philip Goodwin Wright and Alexander Douglas Odell, London, England, assignors, by mesne assignments, to International Standard Electric Corporation, New York, N. Y., a corporation of Delaware Application November 24, 1950, Serial No. 197,207

Claims priority, application Great Britain November 25, 1949

6 Claims. (Cl. 235—61)

This invention relates to electric information storage circuits.

In U. S. Patent No. 2,649,502, there has been described an electric information storage circuit in which information is stored on a chain of static electrical switches in the form of a pattern of operated and unoperated switches, which pattern may be moved as a whole along the chain. Such a storage circuit is known as a pattern of movement chain or shift register.

The invention provides an electric information storage circuit comprising a chain of series-connected static electrical switches on which information is stored in the form of a pattern of operated and unoperated switches, means for progressing the pattern as a whole along the chain of switches and means for modifying the information in a predetermined manner during the progression.

The invention also provides an electric information storage circuit comprising a number of series-connected static electrical switches, in a closed ring arrangement, on which information is stored in the form of a pattern of operated and unoperated switches, means for progressing the pattern as a whole around the ring, and means for modifying the information in a predetermined manner during the progression.

According to the invention there is further provided an electrical information storage circuit comprising a number of series- connected gas-filled discharge tubes on which information in binary notation is stored in the form of a pattern of operated and unoperated tubes, means for progressing the pattern of operated and unoperated tubes as a whole along the chain of tubes and means for modifying the information in a predetermined manner during the progression.

Use has been made of static electrical switches.

For the purpose of this specification and the claims thereof a static electrical switch is defined as a device having a permanently positioned electrical path the effective impedance of which may be either of two different values, change from the one to the other value being effected by appropriate change in a controlling electric or magnetic field from one stable condition to another. The term static electrical switch specifically includes such devices as thermistor trigger circuits, hot cathode gas-filled discharge tubes, cold cathode gas-filled discharge tubes, hard tube trigger circuits, transistors and magnetic trigger devices.

The invention will now be described with reference to several embodiments thereof shown in the accompanying drawings in which.

Fig. 9 provides an illustration of the operation of the multiplication process.

Fig. 10 shows the schematic arrangement according to the invention by means of which simultaneous multiplication and addition may be accomplished, all the switches in this embodiment being static electrical switches.

Figure 11A:
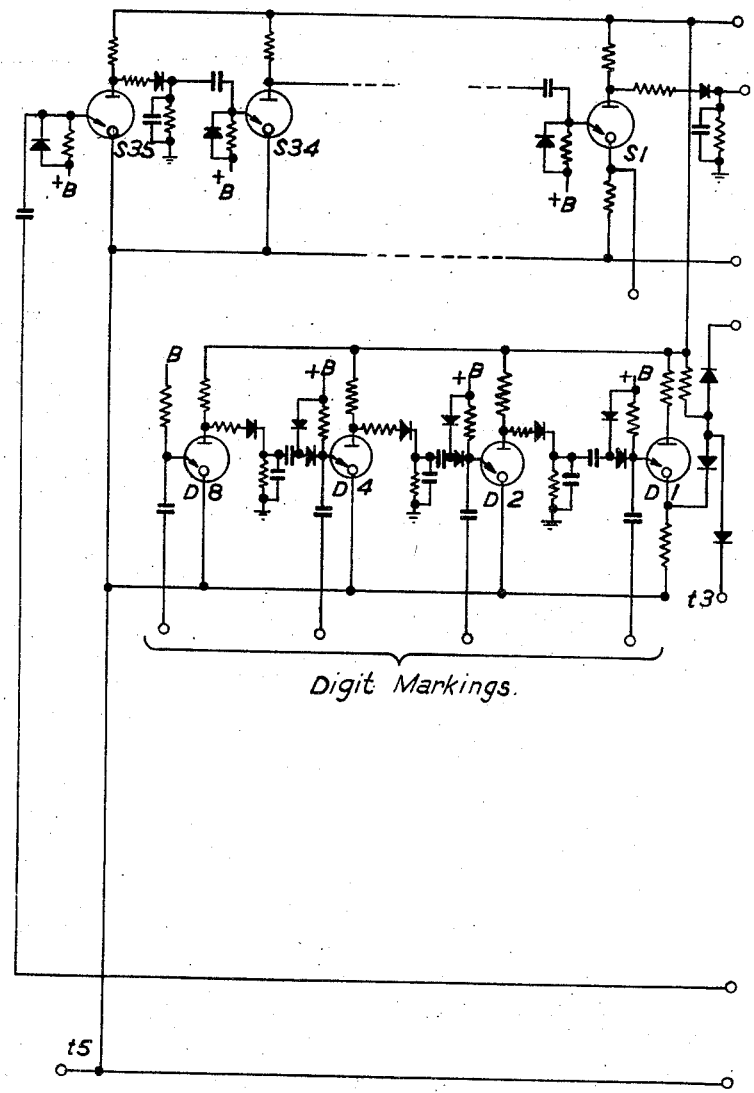
Figure 11B:
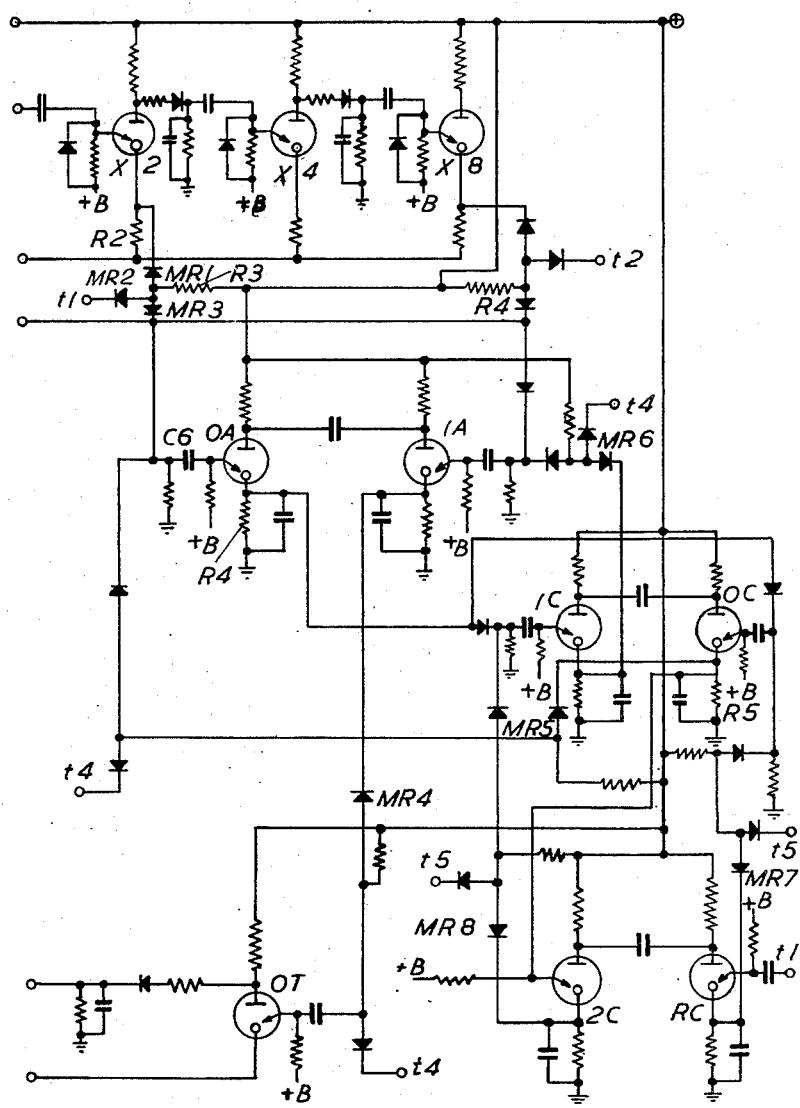

Fig. 11 (in its two parts Figs. 11A and 11B which are to be considered side by side) provides a detailed circuit for the arrangement of Fig. 10.

In the said patent, there has been described a storage circuit in which operated and unoperated switches may respectively represent the binary digits 1 and 0 and a binary number may be progressed as a whole along a chain of interconnected switches. Now if one of those switches is considered as a reviewing point, the digits of the number may be scanned individually as they are driven past the reviewing point. In accordance with the result of the scanning, modifications may be made in the stored number. For example the original number may be multiplied by another quantity, the pattern proceeding beyond the reviewing point being representative of the product. Such embodiments of the invention as this will now be considered.

Figure 1:
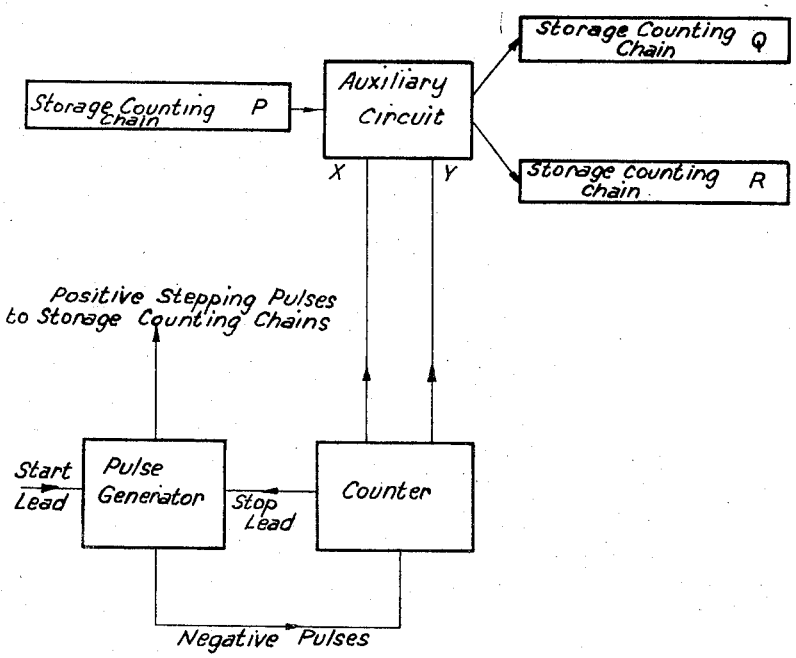
Fig. 1 is a block schematic diagram of a circuit according to the invention for feeding the output from a storage circuit as an impulse train in binary code form into different receiving circuits. This layout is suitable for the performance of the mathematical process of division.

Figure 1 shows diagrammatically how the output from a pattern movement chain of interconnected static electrical switches may be fed into an auxiliary circuit which operates so as to route certain digits of a stored binary number into specified paths. For example, it may be arranged that any number may have its first or lowest significant digit routed into path R, and successive digits into path Q. A possible interpretation of this new information produces on path Q the result of dividing the original number by two, and on path R the remainder after such a division. To achieve this interpretation it is necessary to know the number of steps which each pattern has made, in order that the quotient and remainder shall appear at recognisable positions in their respective paths.

In order to substantiate this interpretation, it is necessary to assume that a number is set up as a pattern of operated and unoperated switches on chain P with its least significant digit to the right. On the receipt of a starting signal a pulse generator begins feeding stepping pulses to all three pattern movement chains P, Q and R, and also to a circuit which counts the pulses as they are produced. Pulses are fed via the counter leads "X" and "Y" to switch the auxiliary circuit previously referred to, and when the number of counting pulses is sufficient to complete the operation, a stop pulse is fed back to close down the pulse generator. The manner of producing the stop pulse will be fully described in the detailed description of Fig. 2.

Figure 2:
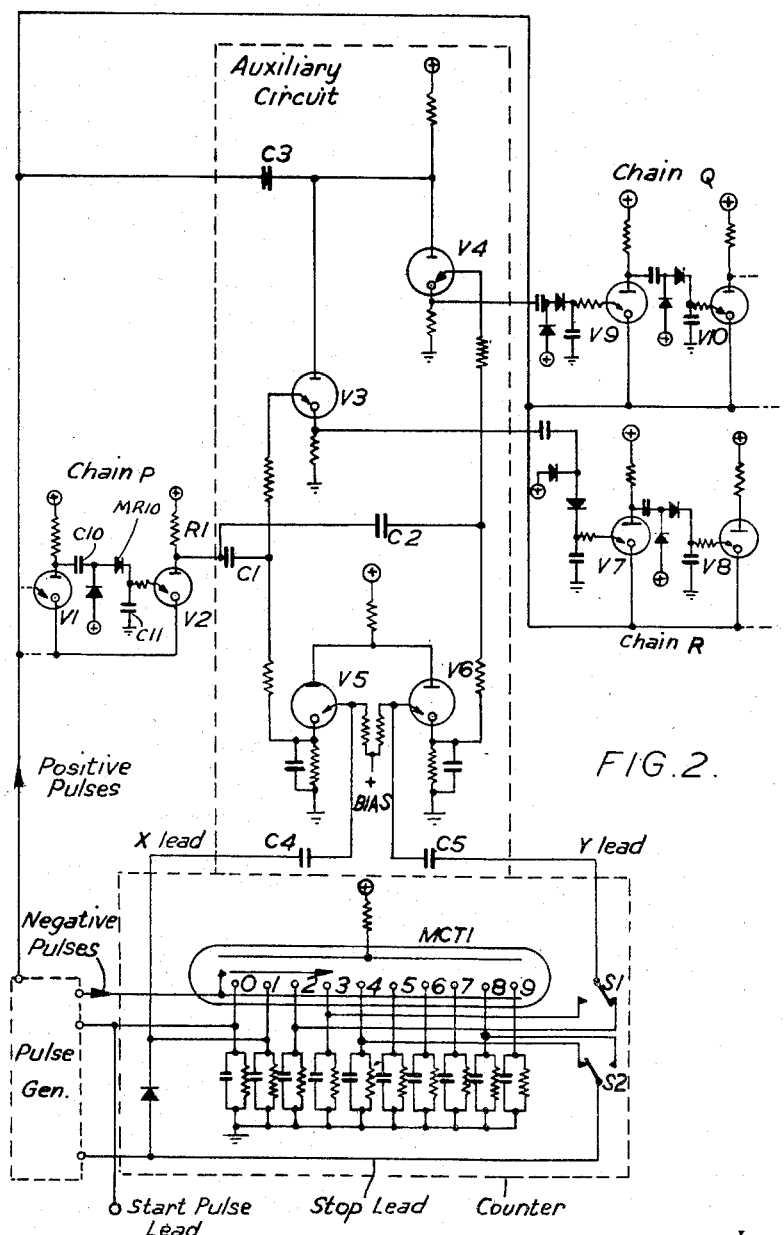
Figs. 2 and 3 show respectively circuit details of, and waveforms encountered in, the circuit which is the subject of Fig. 1.

Before describing the general operation of the circuit of Fig. 2, the operation of the form of pattern movement train of tubes used therein, and in the other embodiments of the invention, will be briefly described. Between each pair of consecutive tubes of the chain is a circuit of the type shown between the anode of V1 and the trigger electrode of V2. A similar circuit exists between the anode of the tube previous to V1 and the trigger of V1. This circuit consists of two rectifiers, two condensers and a resistance. The cathodes of all the tubes of a chain are connected together and to earth via a resistance, which is not shown.

The pattern of information stored on the chain is caused to progress along the chain by applying positive-going impulses to the common point of the cathodes. Assuming that V1 is discharging when a positive pulse appears on its cathode it reduces the anode-cathode potential to below the sustaining voltage, so the tube is extinguished. This causes a rise in the anode voltage of V1, which positive potential is applied over the condenser C10 and rectifier MR10 to charge the condenser C11. When the pulse ends, the positive potential which was thence present on the cathode as V2 is removed, and the positive potential on C11 therefore causes V2 to fire. Had V1 not been discharging when the pulse arrived it would not have been affected thereby and V2 would not have fired when the pulse ended. Thus it will be seen that each pulse extinguishes all tubes in the chain which were discharging, each tube in extinguishing primes the next tube, and the end of the pulse fires any primed tubes. Thus the pattern of stored information is caused to progress along the chain. This form of pattern movement chain is fully described in said copending application.

Figure 3:
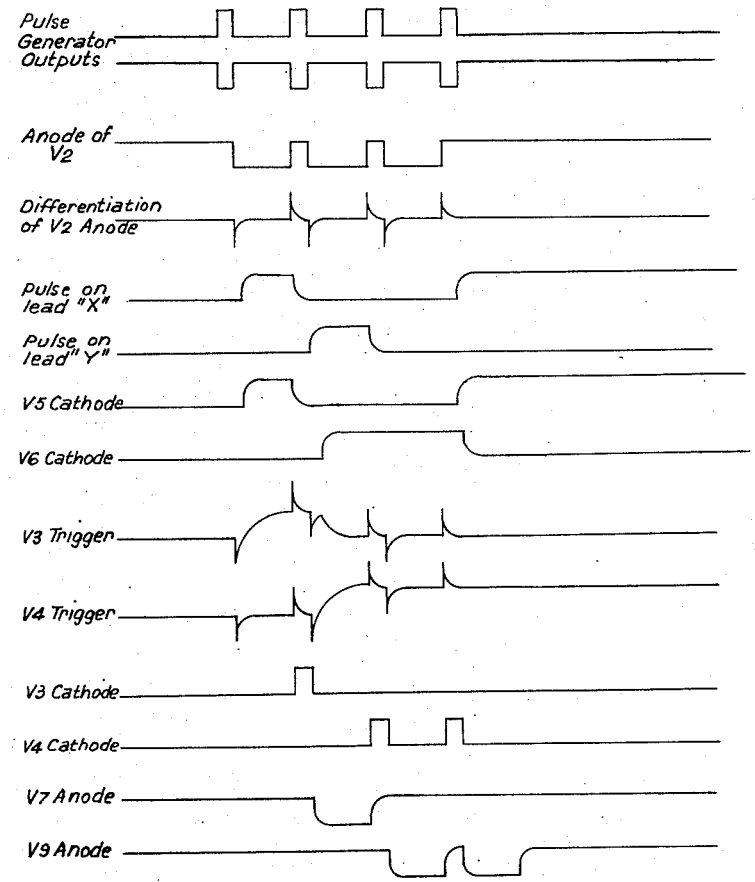

Figure 2 shows one arrangement for the auxiliary circuit and counter using gas-filled cold cathode glow discharge tubes, and Figure 3 the waveforms occurring at various points. In Figure 2 the tubes V1 and V2 are the last two tubes of the pattern movement chain P; tubes V3 to V6 with the associated circuitry form the auxiliary circuit of Fig. 1; tubes V7 and V8 are the first two tubes of the pattern movement chain R; and tubes V9 and V10 are the corresponding tubes of the chain Q. As a pattern, representative of a binary number, is advanced along the chain P the individual digits are presented in turn at the tube V2. This is arranged to be fired if the digit is 1 and unfired if it is 0. Immediately following the stepping pulse which forwards a digit 1 to the tube V2 causing the latter to conduct, a drop in potential is experienced across the anode resistance R1 of tube V2. Between adjacent stepping pulses therefore a negative going pulse may be taken directly from the anode of tube V2 to represent each binary digit 1 received by that tube. The waveform at the anode of V2 obtained on receipt of the binary number 111 is shown in Fig. 3. These negative-going pulses are differentiated by being passed through condensers C1 and C2 and applied to the trigger electrodes of tubes V3 and V4 respectively. The latter tubes have bias connections to their trigger electrodes from the cathodes of V5 and V6 respectively. Separate pulses are arranged to be fed on the X and Y leads in turn, the number of stepping pulse intervals between the X and Y lead pulses being variable. In the example illustrated in Fig. 3 these pulses follow one another immediately, with only a stepping pulse width between them. The X and Y lead pulses are arranged to fire the V5 and V6 tubes resepctively, it being assumed that neither of these tubes is initially fired. From the cathodes of V5 and V6, when these tubes are conducting, biassing potentials are obtained for the trigger electrodes of tubes V3 and V4 respectively. A differentiated pulse presented over condenser C1 coincidentally with a biassing potential being provided from the V5 cathode provides a potential difference across the trigger electrode/cathode gap of tube V3 sufficiently large to fire that gap. A positive potential pulse from the pulse generator, differentiated by condenser C3, causes the trigger gap discharge to spread to the main gap of tube V3. V4 can similarly be fired when a biassing potential is obtained from the V6 cathode. Tubes V3 and V4 will conduct only for the duration of the positive pulses applied from the pulse generator, and acting as cathode followers, they supply outputs to the pattern, movement chains R and Q respectively.

The counter shown in Fig. 2 is simple in character and it makes use of a multi-gap gas-filled cold cathode glow discharge tube MCT1. The manner of operation of such tubes in response to negative going pulses has been previously described, for instance in U. S. Patent No. 2,553,585. Both the tube MCT1 and the pulse generator are started by applying a momentary negative potential on the start pulse lead. The pulse generator starts transmitting positive- and negative-going pulses to the chains P Q and R, the tubes V3 and V4, and to the tube MCT1. The latter tube is caused to discharge across its gap between the anode and the cathode designated 0. Negative pulses applied to the transfer electrodes in common cause the discharging condition to step to each of the other cathodes, in turn. The first step causes the discharge to rest for a moment on the cathode 1. A potential difference is developed across the corresponding cathode resistance and as this cathode is connected to the X lead, the momentary potential change is effective as a pulse via this lead. The end of the pulse is caused by the discharging condition moving away from the cathode 1. The X lead pulse is differentiated by the condenser C4 and its leading edge causes the V5 tube to strike, thereby providing a bias for the tube V3 (shown in Fig. 3 as "V5 cathode").

The second pulse from the generator causes the discharging condition in tube MCT1 to step to cathode 2 and during the time it rests there a potential is supplied over S1 back to the Y lead. Differentiated pulses are provided, as a result, from condenser C5 to fire tube V6. On firing, this tube extinguishes tube V5 and a potential obtained from its cathode biasses tube V4. The extinguishing of V5 prevents further firing of tube V3.

The number which is to be modified (namely 111) is originally stored as pattern on chain P with the lowest significant digit registered by tube V1. The first positive pulse from the pulse generator causes the latter digit to move to tube V2. Hence the anode potential of V2 is decreased and only raised again when the tube is extinguished by the next stepping pulse. This restoration of anode potential level gives rise to a positive going pulse, due to the differentiating action of C1 and C2. At this stage only tube V3 is biassed so that V3 fires and not V4. As the other two digits are passed to V2, V4 is biassed and that therefore responds to the latter two digits. V3 passes the first digit to chain R, and V4 the other two to chain Q.

From a study of Fig. 3 it will be seen that it is on the receipt of the second impulse from the generator that a digit-representing pulse is sent to the R chain and on receipt of the third and fourth that two successive pulses are sent to the Q chain. On the fourth generator pulse the discharging condition in the tube MCT1 is stepped to cathode 4. As a result a positive potential is set over S2 back to the pulse generator. This is arranged to stop the generator.

The switch S2 is set so that the stop lead is only marked with the stopping potential when all the digits in the original P chain number have been dealt with. This setting may be performed manually or by a remote control. As shown in the figure the number of digits dealt with may be either three or seven according to the position of the changeover contact S2 but, of course, the stop potential may be taken from any one of several of the tube cathodes, each corresponding to dealing with a different number of digits. In the example chosen above only the first digit of the binary number has been routed into chain R. The resultant pattern stored in chain Q may be considered as the quotient of the original number in chain P divided by two. Any one of a number of multiples of two could be chosen as the divisor. In Fig. 2 this possibility is illustrated by the inclusion of switch S1. With S1 closed to complete the Y lead circuit to the 3 cathode instead of to the 2 cathode, two digits would be transferred to the R chain, thus corresponding to division by four. If it is desired the pattern on chain Q may be passed to chain P if these are series connected so that an iterative process of division becomes possible. The stop potential is fed not only to the pulse generator but also to the X lead so that the conditions of V5 and V6 tubes are changed over ready for any further operation of the auxiliary circuit.

Although described above with reference to division, the arrangement shown may be employed to isolate consecutive trains of digits or items of information fed into the input of chain P. This may have application where "programme" instructions in an electronic calculating machine for instance are recorded in the form of binary code.

Figure 4:
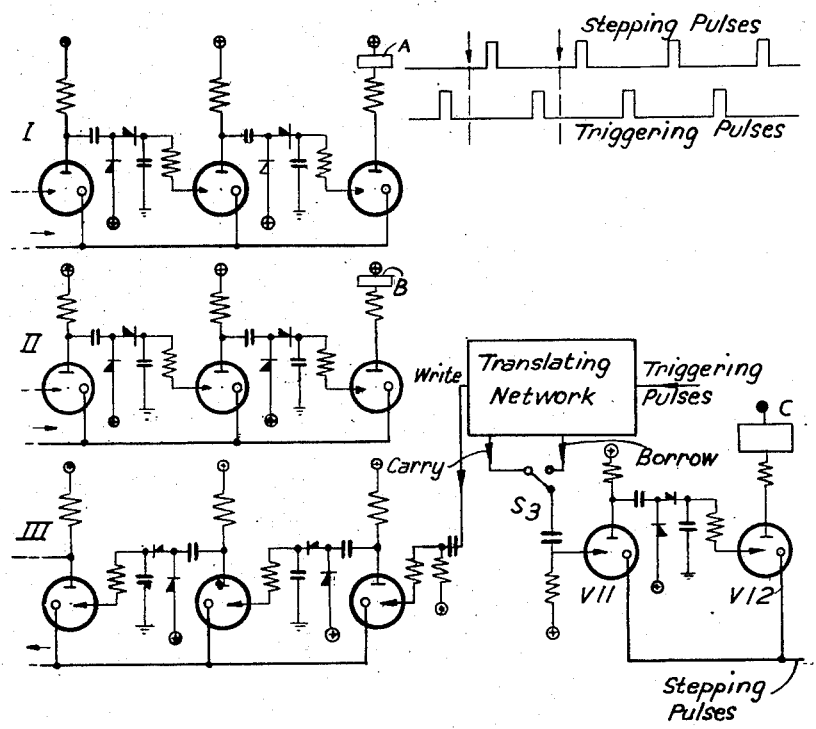
Fig. 4 shows a circuit of another embodiment operable to carry out the mathematical processes of addition and subtraction, whilst Fig. 5 gives details of a translating network indicated in schematic fashion only in Fig. 4.

In Figure 4 is shown an arrangement whereby two binary numbers may be added or subtracted. The two numbers are set up as patterns of operated and unoperated tubes on the cold cathode gas-filled glow discharge tube pattern movement chains I and II respectively. The lowest significant digits of the numbers are arranged to be registered on corresponding tubes in the two chains so that as the number representing patterns are stepped along by the application of driving pulses to the common cathode lead the two lowest significant digits will appear simultaneously at the last tubes in the chains. These tubes have relays A and B in their respective anode circuits so that if both digits are 1 (recorded by the tubes being fired) both relays are operated by the anode currents flowing. As successive digits of the two numbers appear in these tubes, with the continued application of stepping pulses to the chains, the relays A and B respond, each operating for a digit 1 and remaining undisturbed for a digit 0. Contacts on these relays in a translating network are arranged, together with contacts of relay C, to cause a third similar discharge tube pattern movement chain III to be set up with a tube condition pattern corresponding to the sum or difference of the digits controlling the A and B relays. The third relay C modifies the output from the translating network in a way which depends on the results of the addition or subtraction of the previous pair of digits. This corresponds to the process of "carrying" or "borrowing." Each stepping pulse to the counters is preceded by a triggering pulse applied to the translating network. The relationship between these pulses is indicated in the inset diagram. The connection of the relay contacts in the so-called translating network is shown in Figure 5 and the translation performed is given in Figure 6.

The operation of addition or subtraction is simply chosen by the position of the changeover contact S3. In the position in which it is shown in Fig. 4 addition is performed. Triggering pulses are fed into the translating network and from there fed to one or more of the three outlet leads, labelled "Write," "Carry," and "Borrow." A pulse on the write lead effects the recording of a binary digit on the result indicating chain III which is stepped by pulses applied to its tube cathodes in synchronism with those applied to chains I and II. Pulses on the carry or borrow leads are fed to an auxiliary pattern movement chain of two tubes V11 and V12, only one lead being connected to this chain at a time via the S3 switch. The relay C is contained in the anode circuit of the V12 tube.

Figures 5, 6:
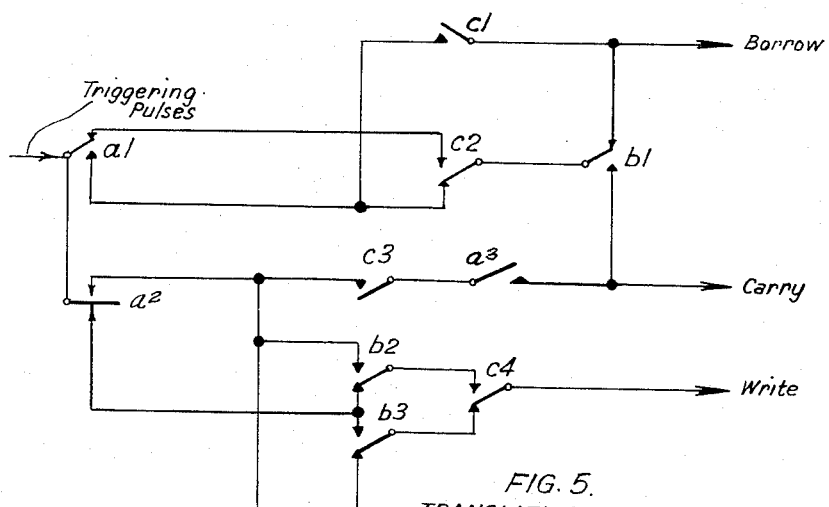
Figs. 6 and 7 are further illustrations of the detailed operation of the Fig. 4 circuit.

The translating network is shown in Fig. 5 in its normal condition, i. e. with relays A, B and C unoperated. It will be seen that a triggering pulse applied to contact $a1$ does not find an outlet to any one of the three leads. Consider now the case where relay A is operated and B and C are unoperated. An applied pulse is then fed over $a2$ front, $b3$ and $c4$ back to the write lead and over $a1$ front, $c2$ and $b1$ back to the borrow lead. To take another example, suppose that relays A and C are operated. An applied pulse is then fed over $a1$ and $c1$ front to the borrow lead and over $a2$ and $c3$ and $a3$ front to the carry lead. As previously stated only one of the borrow and carry leads is taken to the auxiliary chain via the switch S3. A full table of the possibilities with any selection of the A, B and C relays operated is given in Fig. 6. In a subtraction operation the smaller number stored on chain I is taken from the larger number on chain II.

Figure 7:
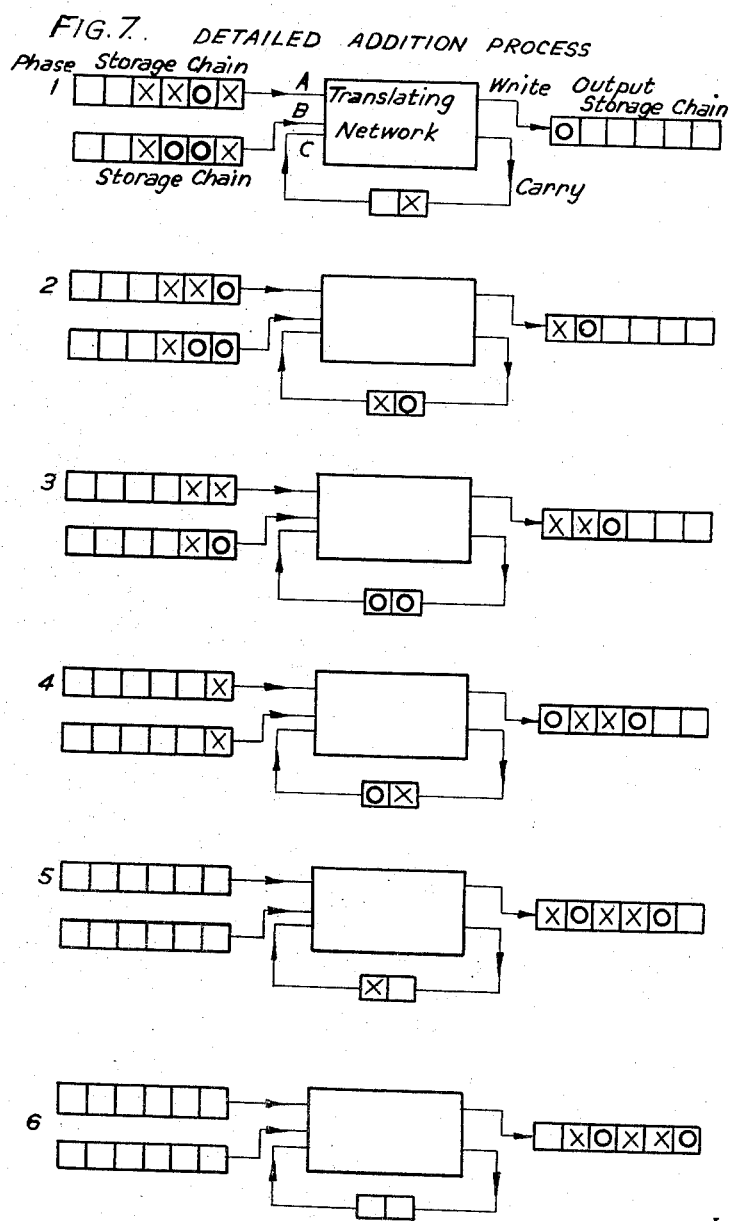

Figure 7 gives a step-by-step picture of a particular example of addition, namely the process of adding the binary number 1001 to the binary number 1101. Each phase represents the pattern arrangement which is present just following the application of a triggering pulse. If there are "n" storage positions in the output chain, then "n" triggering and "n" stepping pulses will be required to eliminate ambiguity and to ensure that the resultant number is in a predetermined position in the output storage chain.

In Fig. 7 squares representative of fired tubes are marked with a × and unfired ones with O. Those not concerned at any particular instant with the process being performed are left unmarked. In phase 1 there is seen the position when the stepping pulses have progressed the two numbers to the end of their respective storage chains I and II. Relays A and B are operated and a triggering pulse has been applied to the translating network. From Fig. 6 it will be observed that this combination of relays operated causes the triggering pulse to be passed to the carry lead, there being no output on either of the other leads. Hence a digit 1 is passed to the first tube (VII, Fig. 4) because of S3 being as in Fig. 4, whilst the resultant digit 0 is indicated by there being no output on the write lead.

The next stepping pulse gives rise to the condition shown in Fig. 7, phase 2. The numbers have all been moved up one digit space and the digit 1 in the auxiliary chain has also been re-recorded on tube V12. Relays A and B are unoperated and C is operated. From Fig. 6 it is seen that a triggering pulse applied to the translative network under these conditions causes it to be applied to the write and borrow leads. Because of the position of the S3 switch during an addition process the pulse output on the borrow lead is ineffective. The write lead pulse causes a digit 1 to be recorded by the firing of the first tube in the output storage chain.

Subsequent stepping and triggering pulses cause the operation to proceed as shown in Fig. 7. Finally both of the storage chains in which the original numbers (1101 and 1001) were registered are cleared and the resultant (10110) has been positioned in a predetermined manner in the output storage chain. Although it has not been shown, a subtraction process can be followed through in a similar manner, switch S3 being set appropriately. It is not essential for the two storage chains I and II to be provided, all that is required is that there should be means responsive simultaneously to corresponding digits of the two numbers, which means can cause the operation of the appropriate contacts of the translating network. Moreover an output storage chain is not essential for the triggering pulses passed over the write lead provide the binary resultant in time-spaced pulse form, the presence of a pulse at a time position indicating a digit 1 and the absence a digit 0.

By a repetitive subtraction process a division sum may be accomplished. If the divisor is subtracted repeatedly first from the dividend and then from the resultant at each stage and a record is kept of the number of times this is done, there will come the time when the resultant is smaller than the divisor. This is detectable for the attempt to produce further subtraction produces an indeterminate answer; the circuit repeatedly feeds out the binary digit 1. The number of completed subtractions before this happens gives the quotient and the last resultant is the remainder.

Figure 8:
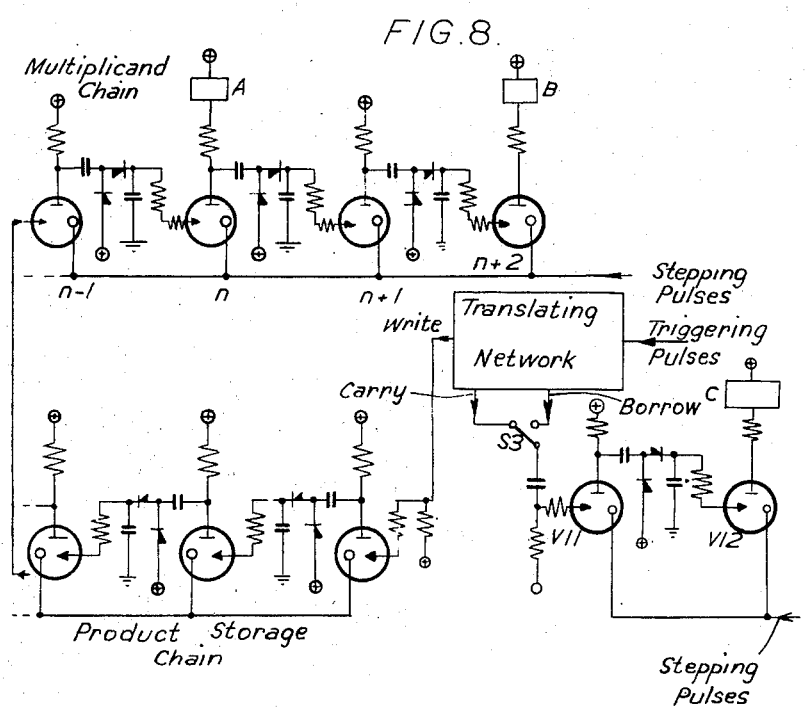
Fig. 8 is a multiplication circuit according to the invention.

Multiplication may also be carried out by the use of the same translative network, and Figure 8 shows a gas-filled cold cathode discharge tube circuit arrangement for multiplying a number by either three or five. To multiply by five, a number is added to four times itself, and to multiply by three, either a number is added to twice itself or a number is subtracted from four times itself.

Considering multiplication by five, the multiplicand is set up on the counting chain (Figure 8), with its least significant digit indicated by discharge tube "$n$." The relay C is switched to be controlled from the "carry" lead by appropriate positions of switch S3, and triggering and stepping pulses are applied as before. The product appears on the "write" lead and may be passed to a product counting chain or alternatively it may be fed back into a multiplicand chain either directly or via a product counting chain.

In Fig. 9 the different phases, as in Fig. 7, show the conditions obtaining immediately subsequent to the application of successive triggering pulses. The detailed operation of the process of multiplication is set out, the problem considered being that mentioned above, the multiplication of a number, in this instance 1011 in the binary notation (or eleven on the decimal basis), by five (i. e. 101). In the same relationship as for addition triggering pulses are sent to the translating network. The successive alterations that take place in the following phases are shown in Fig. 9. It will be noticed that finally the binary number 110111 (decimal equivalent 55) is obtained in the output storage chain. As in Fig. 7, the unfired tubes not directly concerned with the operation are not indicated by "O," this is so that the actual process will stand out clearly.

As will be seen from Fig. 8 multiplication by five involves the insertion of relays A and B in the anode circuits of the tubes $n$ and $n+2$. The multiplicand is stepped as a binary pattern of operated and unoperated tubes along the multiplicand chain by stepping pulses applied to the tube cathodes in common. The same stepping pulses are also applied to the product storage chain and to the auxiliary chain comprising tubes V11 and V12, relay C being in the V12 anode circuit as before.

The detailed multiplication process set forth in Fig. 9 may be followed through with the aid of Fig. 6 in a similar manner to that already described for the addition process. If the auxiliary chain had been fed via switch S3 from the borrow lead multiplication by three would have been effected the product with the same multiplicand being 100001.

If the multiplicand is stored in the storage chain so that its least significant digit as before is represented by the condition of the $n$th tube, the switch S3 is in the "carry" position and the A and B relays are in the anode circuits of the $n$ and ($n+3$) tubes then multiplication by nine will be effected. With S3 connecting the borrow lead to tubes V11 and V12 the multiplier would be seven. Other multipliers can be simulated by other spacings of the A and B relays together with appropriate settings of switch S3. The output instead of being fed in to a separate product storage chain can be re-circulated into the multiplicand chain and a further multiplication carried out upon it.

In Figs. 10 and 11 is shown an arrangement for carrying out simultaneously binary multiplication and addition. In this embodiment of the invention there are no moving parts such as relay contacts, the operation is entirely by cold cathode gas-filled glow discharge tubes.

The general outline of this embodiment will first be described with reference to Fig. 10.

Fig. 10 only shows a schematic diagram of the apparatus, no circuit components, with the exception of gas-filled cold cathode glow discharge tubes and one or two condensers, are included. On the leads, however, there are crosses show at one or two places. These indicate gating circuits which are only opened at the time indicated by the legends alongside them.

The circuit consists of a running total chain comprising 35 cold cathode tubes arranged as a pattern movement chain, three multiplication tubes connected to one end and forming a continuation of the running total chain, and four digit marking tubes. There are also three pairs of cold cathode tubes in flip-flop arrangement which accomplish the actual multiplication and addition. Associated with the latter tubes OA . . . RC is an output tube OT. The tubes of the running total chain are numbered S35 . . . S1 and on these is stored the multiplicand in binary notation. The multiplicand is a binary number represented by a pattern of operated and unoperated tubes and the pattern as a whole is stepped along the chain. When the lowest significant digit reaches the tube S1, three further steps will take it to the multiplication tubes X2, X4 and X8 in that order. In the arrangement shown the multiplication is by a multiplier of 10, that is 1010 in the binary notation. The circuit is able not only to carry out a multiplication but also to add in another number simultaneously. The result of this process is returned via tube OT into the running total chain.

The operation of the circuit requires a cycle of time pulses, five pulses to a cycle, and the pulses are arranged to open gates at various points in the circuit. The mathematical circuit, the actual equipment which accomplishes the calculation and which consists of the tube OA, 1A, 1C, OC, 2C and RC, is arranged to scan or monitor the condition of the multiplication tubes and the digit marking chain during a cycle and to react accordingly. If the result of the operation is to be that the binary digit 1 is to be passed to the outlet tube, then the tube 1A will be acuated. If the result of the scanning requires that a binary digit 1 should be prepared as a carry forward, then the tube 1C is operated, if two digits need to be prepared for carry forward then the 2C tube is operated. Once in each cycle the condition of the tube 1A is monitored and if it is then operated the output tube OT responds and as a result a binary digit 1 is passed to the running total chain. If during a cycle the tubes 1C or 2C are operated, they will react upon the condition of 1A in the next following cycle. A number of cycles of the five time positions is required to consider the digits of the multiplicand in turn and the digits of the additional number on the digit marking chain also in turn. The fifth pulse of each cycle causes each of the chains to step and a restoring condition is also applied to the tubes 1C and OC. As the step pulses at $t5$ are applied both to the digit marking chain and to the running total chain, these step in synchronism and the least significant digit of the multiplicand will have reached the X8 tube at the same time as the largest significant digit of the number (on D8 . . . D1) to be added has reached the D1 tube. This requires three complete cycles. The digits of the multiplicand are considered as they occur at the tubes X2 and X8 after one and three steps of the pattern respectively. This is so that multipliers of 2 and 8 respectively may be brought in, the result being a multiplication by 10. It is, of course, appreciated that moving a binary pattern by 1 and by 3 places corresponds to multiplication by 2 and by 8.

Consider now that the binary digit 1 is recorded by the tube S1 being conducting and a binary digit 1 is also recorded by the tube D1 being conducting. X2, X4 and X8 tubes, as well as the other D tubes are all non-conducting; in the mathematical circuit, tubes OA and OC are normally conducting and at the beginning of the operation the tube 2C is conducting. A cycle of five pulses will produce the following result. At the time position $t1$ the condition of the tube X2 is monitored and as this tube is not conducting no potential is applied to either OA or 1A trigger electrodes. Similarly at the time $t2$, X8 is not conducting and OA and 1A are again undisturbed. At the time position $t3$, however, the tube D1 is found to be conducting; this causes the tubes OA and 1A to change over their conditions, that is 1A becomes conducting. At the next time position $t4$ the cathode of tube 1A provides a potential to trigger tube OT. The cathode potential of tube OC together with the time pulse $t4$ provide a triggering potential for the tube OA which fires, restoring the initial condition of the tubes OA and 1A. When tube OA fires the tube 1C is triggered off the cathode of tube OA. As the tube RC has been fired by the first time position $t1$ being applied to its trigger electrode, the pulse occurring at time $t5$ together with the cahode potential of the tube RC cause the tube OC to fire. Tube 1C is therefore, extinguished. Tube OC on firing strikes tube 2C off its cathode potential and the tube RC is extinguished. The pulse occurring at time position $t5$ is also the stepping pulse for the running total and digit marking chains and for the multiplication tubes. The operation takes one step forward at this instant. The lowest significant digit of the result of the monitoring between $t1$ and $t3$ is a binary digit. At time $t4$ this had been recorded by firing tube OT. It is now passed to tube S35. The digit 1 in the digit chain tube D1 is cleared out by the stepping pulse at $t5$. The digit 1 previously recorded by tube S1 being fired is now recorded by the X2 conducting.

In the next cycle at the time position $t1$ the tube RC is refired, 2C being extinguished and the condition of the X2 tube is monitored. Again the conditions of the tube OA/1A tubes are changed over and again in this cycle a digit 1 is passed to the output tube OT. At the time position $t5$ the cycle is completed and the tubes S35 and S34 of the running total chain are now fired and the multiplicand digit passes to tube X4. In the next cycle the monitoring at the time positions $t1$, $t2$ and $t3$ reveals no digit so that the condition of the tubes remains as at the end of the previous cycle. The tubes 1A is not fired during the cycle; hence tube OT is not fired, and at the end of this cycle we shall have tubes S34 and S33 of the running total chain fired whilst S35 is not fired the latter recording a resultant binary digit 0. In the next cycle the time position $t2$ will find that the multiplication tube X8 is operated, but no input to the mathematical circuit is provided from either X2 or D1, so that once again a binary digit 1 is passed to the output tube in this cycle. At the end of the cycle this digit is passed to tube S35 and the circuit is restored. This simple example has given us the result of multiplying a binary digit 1 which was the multiplicand by ten and adding also the binary digit 1 (from the tube D1). The result in the running total chain is that we shall have tubes S35, S33, S32 operated. S34 being not operated. This is a binary result of 1011 that is eleven in decimal notation.

Having appreciated the outline of the circuit from the simple example given above, attention may now be directed to Figs. 11A and 11B which together form Fig. 11 and which give the complete circuit for this apparatus, the running total chain consisting of tubes S35 . . . S1 is series connected to the multiplication tubes X2, X4 and X8, all as a pattern movement chain. This chain is similar to those described in earlier embodiments of the present invention, the pattern being stepped as a whole as a result of positive pulses being applied to the common cathode lead. As stated above the pulses at the different time positions are applied to the circuits at the points labelled in the diagrams at regular intervals in the five-pulse cycle. For instance, a pulse at time position $t1$ is applied to the gating circuit connected to the cathode of the X2 tube. The potential developed across the resistance R2 and the cathode lead of the tube X2 is applied to block the rectifier MR1 and when a pulse at time $t1$ matures blocking rectifiers MR2, a pulse is passed forward over rectifier MR3 to the trigger of tube OA. Such a gating circuit is known and its operation is improved by an H. T. supply being fed to it over a high resistance R3 as has previously been described. The pulse at time $t1$ is shaped by the condenser C6, and together with the bias battery $+B$ already on the trigger electrode of tube OA, the striking potential for the tube is provided. An exactly identical gating circuit is provided for the tube X8 and 1A, this being operable at time position $t2$. The pairs of tubes, such as OA and 1A, are flip-flop pairs of well-known design. When OA is fired a potential is developed across its cathode resistance R4 and this, together with the bias potential already present on the trigger electrodes of tubes 1C and OC, fires whichever of these two tubes has previously been non-conducting. When tube OC is fired, a potential developed across its cathode resistance R5 is applied to the trigger of tube 2C, and this, together with the bias potential already present there, is sufficient to strike this tube. When the tube 1A is fired, its cathode potential blocks the rectified MR4, so that a pulse at time position $t4$ is effective to fire tube OT. If at the time $t4$ the tube OC is fired, rectifier MR5 is blocked out, therefore, a triggering pulse is sent to the trigger of tube OA. If this is not already fired, it is fired at this point. If, however, at time $t4$ the tube 1C has been fired, then rectifier MR6 is blocked and the triggering potential is directed to the tube 1A rather than the tube OA. The time position $t5$ pulse is used to step the digit and running total chains, as has previously been said. Also at time $t5$ the tube RC may be conducting, in which case rectifier MR7 is blocked and a triggering potential is sent to the tube OC. If this was not previously fired, it is fired by this triggering pulse. If, however, at the time $t5$ the tube 2C rather than the tube RC was fired, then the rectifier MR8 is blocked and the triggering pulse is sent to the tube 1C rather thon the tube OC. If this was not previously fired, it is now fired and tube OC is extinguished. To each of the various gating circuits high resistances, such as that already indicated for the X2 tube gating circuit, are provided. One of these is shown at R4 for the X8 tube gate.

The detailed performance of this circuit for certain specific examples is set out fully in Tables I to IV below; in these tables only those time positions have been indicated of which some change occurs in the circuit. Also the conditions shown are those pertaining after all the changes, initiated by the maturing of the particular pulse, have occurred. In each case a number has already been assumed to be in the running total chain and in three of the tables a number has also been applied to the digit chain over the digit marking leads. It will be appreciated that potentials applied to these leads cause the triggering of the tubes D1 to D8 in the appropriate combinations.

*Simultaneous multiplication of 7×10 and addition of 15 in binary notation*

[Output=1010101 (85).]

| Time | S3 | S2 | S1 | X2 | X4 | X8 | D1 | D2 | D4 | D8 | OA | 1A | 1C | OC | 2C | RC | OT |
|---|---|---|---|---|---|---|---|---|---|---|---|---|---|---|---|---|---|
| t1 | 1 | 1 | 1 | 0 | 0 | 0 | 1 | 1 | 1 | 1 | 1 | 0 | 0 | 1 | 0 | 1 | 0 |
| t3 | | | | | | | | | | | 0 | 1 | 0 | 1 | 0 | 1 | 0 |
| t4 | | | | | | | | | | | 1 | 0 | 1 | 0 | 0 | 1 | 1 |
| t5 | | 1 | 1 | 1 | 0 | 0 | 1 | 1 | 1 | 0 | 1 | 0 | 0 | 1 | 1 | 0 | 0 |
| t1 | | | | | | | | | | | 0 | 1 | 0 | 1 | 0 | 1 | 0 |
| t3 | | | | | | | | | | | 1 | 0 | 1 | 0 | 0 | 1 | 0 |
| t4 | | | | | | | | | | | 0 | 1 | 1 | 0 | 0 | 1 | 0 |
| t5 | | | 1 | 1 | 1 | 0 | 1 | 1 | 0 | 0 | 0 | 1 | 0 | 1 | 1 | 0 | 0 |
| t1 | | | | | | | | | | | 1 | 0 | 1 | 0 | 0 | 1 | 0 |
| t3 | | | | | | | | | | | 0 | 1 | 1 | 0 | 0 | 1 | 0 |
| t4 | | | | | | | | | | | 0 | 1 | 1 | 0 | 0 | 1 | 1 |
| t5 | | | | 1 | 1 | 1 | 1 | 0 | 0 | 0 | 0 | 1 | 0 | 1 | 1 | 0 | 0 |
| t1 | | | | | | | | | | | 1 | 0 | 1 | 0 | 0 | 1 | 0 |
| t2 | | | | | | | | | | | 0 | 1 | 1 | 0 | 0 | 1 | 0 |
| t3 | | | | | | | | | | | 1 | 0 | 0 | 1 | 1 | 0 | 0 |
| t4 | | | | | | | | | | | 1 | 0 | 0 | 1 | 1 | 0 | 0 |
| t5 | | | | | 1 | 1 | 0 | 0 | 0 | 0 | 1 | 0 | 1 | 0 | 0 | 1 | 0 |
| t1 | | | | | | | | | | | 1 | 0 | 1 | 0 | 0 | 1 | 0 |
| t2 | | | | | | | | | | | 0 | 1 | 1 | 0 | 0 | 1 | 0 |
| t4 | | | | | | | | | | | 0 | 1 | 1 | 0 | 0 | 1 | 1 |
| t5 | | | | | | 1 | 0 | 0 | 0 | 0 | 0 | 1 | 0 | 1 | 1 | 0 | 0 |
| t1 | | | | | | | | | | | 0 | 1 | 1 | 0 | 0 | 1 | 0 |
| t2 | | | | | | | | | | | 1 | 0 | 1 | 0 | 0 | 1 | 0 |
| t4 | | | | | | | | | | | 0 | 1 | 1 | 0 | 0 | 1 | 0 |
| t5 | | | | | | 0 | 0 | 0 | 0 | 0 | 0 | 1 | 0 | 1 | 1 | 0 | 0 |
| t1 | | | | | | | | | | | 0 | 1 | 0 | 1 | 0 | 1 | 0 |
| t4 | | | | | | | | | | | 1 | 0 | 1 | 0 | 0 | 1 | 1 |
| t5 | | | | | | | | | | | 1 | 0 | 0 | 1 | 1 | 0 | 0 |

*Simultaneous multiplication of 7×10 and addition of 9 in binary notation*

[Output=1001111 (79).]

| Time | S3 | S2 | S1 | X2 | X4 | X8 | D1 | D2 | D4 | D8 | OA | 1A | 1C | OC | 2C | RC | OT |
|---|---|---|---|---|---|---|---|---|---|---|---|---|---|---|---|---|---|
| t1 | 1 | 1 | 1 | 0 | 0 | 0 | 1 | 0 | 0 | 1 | 1 | 0 | 0 | 1 | 0 | 1 | 0 |
| t3 | | | | | | | | | | | 0 | 1 | 0 | 1 | 0 | 1 | 0 |
| t4 | | | | | | | | | | | 1 | 0 | 1 | 0 | 0 | 1 | 1 |
| t5 | | 1 | 1 | 1 | 0 | 0 | 0 | 0 | 1 | 0 | 1 | 0 | 0 | 1 | 1 | 0 | 0 |
| t1 | | | | | | | | | | | 0 | 1 | 0 | 1 | 0 | 1 | 0 |
| t4 | | | | | | | | | | | 1 | 0 | 1 | 0 | 0 | 1 | 1 |
| t5 | | | 1 | 1 | 1 | 0 | 0 | 1 | 0 | 0 | 1 | 0 | 0 | 1 | 1 | 0 | 0 |
| t1 | | | | | | | | | | | 0 | 1 | 0 | 1 | 0 | 1 | 0 |
| t4 | | | | | | | | | | | 1 | 0 | 1 | 0 | 0 | 1 | 1 |
| t5 | | | | 1 | 1 | 1 | 1 | 0 | 0 | 0 | 1 | 0 | 0 | 1 | 1 | 0 | 0 |
| t1 | | | | | | | | | | | 0 | 1 | 0 | 1 | 0 | 1 | 0 |
| t2 | | | | | | | | | | | 1 | 0 | 1 | 0 | 0 | 1 | 0 |
| t3 | | | | | | | | | | | 0 | 1 | 1 | 0 | 0 | 1 | 0 |
| t4 | | | | | | | | | | | 0 | 1 | 1 | 0 | 0 | 1 | 1 |
| t5 | | | | | 1 | 1 | 0 | 0 | 0 | 0 | 0 | 1 | 0 | 1 | 1 | 0 | 0 |
| t1 | | | | | | | | | | | 0 | 1 | 0 | 1 | 0 | 1 | 0 |
| t2 | | | | | | | | | | | 1 | 0 | 1 | 0 | 0 | 1 | 0 |
| t4 | | | | | | | | | | | 0 | 1 | 1 | 0 | 0 | 1 | 0 |
| t5 | | | | | | 1 | 0 | 0 | 0 | 0 | 0 | 1 | 0 | 1 | 1 | 0 | 0 |
| t1 | | | | | | | | | | | 0 | 1 | 0 | 1 | 0 | 1 | 0 |
| t2 | | | | | | | | | | | 1 | 0 | 1 | 0 | 0 | 1 | 0 |
| t4 | | | | | | | | | | | 0 | 1 | 1 | 0 | 0 | 1 | 0 |
| t5 | | | | | | | 0 | 0 | 0 | 0 | 0 | 1 | 0 | 1 | 1 | 0 | 0 |
| t1 | | | | | | | | | | | 0 | 1 | 1 | 0 | 0 | 1 | 0 |
| t4 | | | | | | | | | | | 1 | 0 | 0 | 1 | 0 | 1 | 1 |
| t5 | | | | | | | | | | | 1 | 0 | 0 | 1 | 1 | 0 | 0 |

*Simultaneous multiplication of 3×10 and addition of 7 in binary notation*

[Output=100101 (37).]

| Time | S2 | S1 | X2 | X4 | X8 | D1 | D2 | D4 | D8 | OA | 1A | 1C | OC | 2C | RC | OT |
|---|---|---|---|---|---|---|---|---|---|---|---|---|---|---|---|---|
| t1 | 1 | 1 | 0 | 0 | 0 | 1 | 1 | 1 | 0 | 1 | 0 | 0 | 1 | 0 | 1 | 0 |
| t3 | | | | | | | | | | 0 | 1 | 0 | 1 | 0 | 1 | 0 |
| t4 | | | | | | | | | | 1 | 0 | 1 | 0 | 0 | 1 | 1 |
| t5 | | 1 | 1 | 0 | 0 | 1 | 1 | 0 | 0 | 1 | 0 | 0 | 1 | 1 | 0 | 0 |
| t1 | | | | | | | | | | 0 | 1 | 0 | 1 | 0 | 1 | 0 |
| t3 | | | | | | | | | | 1 | 0 | 1 | 0 | 0 | 1 | 0 |
| t4 | | | | | | | | | | 0 | 1 | 1 | 0 | 0 | 1 | 0 |
| t5 | | | 1 | 1 | 0 | 1 | 0 | 0 | 0 | 0 | 1 | 0 | 1 | 1 | 0 | 0 |
| t1 | | | | | | | | | | 1 | 0 | 1 | 0 | 0 | 1 | 0 |
| t3 | | | | | | | | | | 0 | 1 | 1 | 0 | 0 | 1 | 0 |
| t4 | | | | | | | | | | 0 | 1 | 1 | 0 | 0 | 1 | 1 |
| t5 | | | | 1 | 1 | 0 | 0 | 0 | 0 | 0 | 1 | 0 | 1 | 1 | 0 | 0 |
| t1 | | | | | | | | | | 1 | 0 | 1 | 0 | 0 | 1 | 0 |
| t2 | | | | | | | | | | 0 | 1 | 1 | 0 | 0 | 1 | 0 |
| t4 | | | | | | | | | | 0 | 1 | 1 | 0 | 0 | 1 | 0 |
| t5 | | | | | 1 | 0 | 0 | 0 | 0 | 0 | 1 | 0 | 1 | 1 | 0 | 0 |
| t1 | | | | | | | | | | 0 | 1 | 1 | 0 | 0 | 1 | 0 |
| t2 | | | | | | | | | | 1 | 0 | 1 | 0 | 0 | 1 | 0 |
| t4 | | | | | | | | | | 0 | 1 | 1 | 0 | 0 | 1 | 0 |
| t5 | | | | | | 0 | 0 | 0 | 0 | 0 | 1 | 0 | 1 | 1 | 0 | 0 |
| t1 | | | | | | | | | | 0 | 1 | 0 | 1 | 0 | 1 | 0 |
| t4 | | | | | | | | | | 1 | 0 | 1 | 0 | 0 | 1 | 1 |
| t5 | | | | | | | | | | 1 | 0 | 0 | 1 | 1 | 0 | 0 |

Multiplication of 3×10 in binary notation

[Output=11110 (30).]

| Time | S2 | S1 | X2 | X4 | X8 | OA | 1A | 1C | OC | 2C | RC | OT |
|------|----|----|----|----|----|----|----|----|----|----|----|----|
| t1 | 1 | 1 | 0 | 0 | 0 | 1 | 0 | 0 | 1 | 0 | 1 | 0 |
| t4 |   |   |   |   |   | 1 | 0 | 0 | 1 | 0 | 1 | 0 |
| t5 |   | 1 | 1 | 0 | 0 | 1 | 0 | 0 | 1 | 1 | 0 | 0 |
| t1 |   |   |   |   |   | 0 | 1 | 0 | 1 | 0 | 1 | 0 |
| t4 |   |   |   |   |   | 1 | 0 | 1 | 0 | 0 | 1 | 1 |
| t5 |   |   | 1 | 1 | 0 | 1 | 0 | 0 | 1 | 1 | 0 | 0 |
| t1 |   |   |   |   |   | 0 | 1 | 0 | 1 | 0 | 1 | 0 |
| t4 |   |   |   |   |   | 1 | 0 | 1 | 0 | 0 | 1 | 1 |
| t5 |   |   |   | 1 | 1 | 1 | 0 | 0 | 1 | 1 | 0 | 0 |
| t1 |   |   |   |   |   | 1 | 0 | 0 | 1 | 0 | 1 | 0 |
| t2 |   |   |   |   |   | 0 | 1 | 0 | 1 | 0 | 1 | 0 |
| t4 |   |   |   |   |   | 1 | 0 | 1 | 0 | 0 | 1 | 1 |
| t5 |   |   |   |   | 1 | 1 | 0 | 0 | 1 | 1 | 0 | 0 |
| t1 |   |   |   |   |   | 1 | 0 | 0 | 1 | 0 | 1 | 0 |
| t2 |   |   |   |   |   | 0 | 1 | 0 | 1 | 0 | 1 | 0 |
| t4 |   |   |   |   |   | 1 | 0 | 0 | 0 | 0 | 1 | 1 |
| t5 |   |   |   |   |   | 1 | 0 | 0 | 1 | 1 | 0 | 0 |

One application in which this circuit is clearly well able to be used is as follows: The digits of a decimal number are converted into binary notation and applied to the digit marking leads on the digit chain in turn. If the highest significant digit is first applied to the digit marking leads and no number is inserted by any means into the running total chain, then a cycle of operation, that is from $t1$ to $t5$, will cause this digit from the digit chain to be passed to the running total chain without any alteration. Consider now that the digit is stepped along the running total chain until the least significant binary digit is present on the tube S1. Now let the next highest decimal digit be transferred to binary notation and applied to the digit chain. If multiplication is by 10, as has previously been described, then the orginal decimal digit will be multiplied by 10 and the second decimal digit will be added to it, the binary resultant being passed to the running total chain. This resultant can be passed along the chain until its lowest significant binary digit reaches the tube S1 when the next decimal digit can be applied to the digit chain as a binary number. In this way successive decimal digits can be added in and multiplication by 10 can be automatically accomplished for each digit added; the last decimal digit in its binary form being added to the total without alteration. Circuits are known for translating decimal digits into binary form and these can be used for applying the digits in turn to the digit marking leads. Hence, a simple method is provided for turning a decimal number into the equivalent binary number, where a number of decimal digits are involved.

The circuit is not limited of course to the multiplication being by the multiplier 10. The X2 and X4 tubes might be monitored at the time positions $t1$ and $t2$ instead of the tubes X2 and X8. This would produce a multiplication by 6 instead of by 10. If a lead is taken off the cathode resistance of the S1 tube, multiplication by odd numbers can be achieved. For example, if the S1 tube is monitored at the time position $t1$ and the X4 tube at the time position $t2$ then multiplication by 5 is effected. Thus we have a circuit involving only a few components which is capable of multiplying a given number in its binary form by a number of different multipliers and which is also capable of simultaneously adding in another number in binary form. All this can be accomplished at a very high speed. Known pulse generators can be used for providing the cycles of five pulses. For instance, a pulse supply fed to a multi-gap gas-filled cold cathode glow discharge tube, as shown at MCT1 in Fig. 2, can be caused to give the necessary output. Cathodes 0 and 5, 1 and 6 . . . 4 and 9 are provided in pairs with common resistance capacity networks to earth and across the five networks the output pulses are obtained in turn as the glow discharge is moved around the cathodes in response to negative pulses from the supply fed to the commoned transfer electrodes.

Although in the above embodiments the resultant information from the equipment performing the calculation in each case is fed to a pattern movement chain there is no reason why the pulse output should not be fed direct to a line (e. g. from the gating network in the tube 1A cathode circuit). Pattern movement chains of static electrical switches employing switches other than cold cathode tubes are available. For instance magnetic trigger devices have been arranged to provide information storage circuits in which the magnetic flux conditions of certain cores are representative of the stored information. The pattern of core conditions may be progressed as a whole along the chain in response to driving pulses applied to the cores. Such circuits have been described, and embodiments of the present invention may incorporate them.

Although the embodiments of the invention described above have had particular reference to circuits for accomplishing calculations in binary notation, it will be appreciated that the invention has much wider application.

While the principles of the invention have been described above in connection with specific embodiment, and particular modifications thereof, it is to be clearly understood that this description is made only by way of example and not as a limitation on the scope of the invention.

What we claim is:

1. An electrical information storage device which comprises three chains of static electrical switches, the switches of each said chain being interconnected in series in such a way as to form a pattern movement chain on which information may be stored as a pattern of operated and unoperated switches, which pattern can be caused to move as a whole along said chain, the first pattern movement chain being initially set to store information and the second and third said chains being initially set to record zero stored information, a counting circuit, means for setting said counting circuit to count a predetermined number $n$, a control device, means for applying to said control device the pattern appearing at one switch of said first chain element by element successively, and a switching device under control of said counting circuit and arranged to transfer the first $n$ elements of the information stored in said first chain to said second chain and transfer elements of information subsequent to said first $n$ elements to said third chain, whereby if the information stored in said first chain is a number represented in binary code said number may be divided by a $2^n$, where $n=1, 2, 3, 4 \ldots$, the quotient being represented by the number in said third chain and the remainder by the number (if any) in said second chain.

2. An electrical information storage circuit which comprises a first chain of series connected gas-filled discharge tubes on which information in binary code is stored in the form of a pattern of operated and unoperated tubes, a pulse generator, a pulse counting circuit to which are applied pulses from said pulse generator, second and third chains of discharge tubes similar to said first tube chain but both initially recording zero stored information, connections from said pulse generator to the tubes of each said chain in common by means of which pulses are fed to said three chains to cause any patterns of operated and unoperated tubes thereon to be stepped as a whole along the respective chains, each said pattern stepping along one tube distance on each applied pulse, a variably operable switching arrangement, means for applying the condition of the last tube in said first chain to said switching arrangement, a control device settable to a predetermined number, and means under control of said counting circuit and of said control device and arranged to cause said switching arrangement to transfer a tube condition from said first chain to said second chain on each pulse from said generator until said pulse counter has received a number of pulses equal to said pre-determined number, whereafter said switching arrangement is arranged to thereafter transfer a tube condition from said first chain to said third chain on each said pulse.

3. An electrical calculating circuit, which comprises a chain of static electrical switches interconnected in series to form a pattern movement chain on which a multiplicand number can be stored in binary code as a pattern of operated and unoperated switches, an operated switch representing the binary digit one and an unoperated switch representing the binary digit zero, means for moving said pattern as a whole along said chain, a control circuit associated with said chain and including means for causing the numbers appearing digit-by-digit successively at a certain plurality of said switches during said movement to produce predetermined combinations of pulse trains in said control circuit, and means in said control circuit for summating said pulse trains to produce a pulse train which represents in binary code the product of said multiplicand and a multiplier, which multiplier is determined by said certain plurality of said switches.

4. A circuit as claimed in claim 3, and which comprises a second pattern movement chain on which a further number may be stored in binary code, means for moving the number stored in said second chain as a whole along said second chain in the direction of the switch representing the digit of least significance at the same rate as said multiplicand is moved along said first pattern movement chain, means for applying said further number as it appears digit-by-digit successively at the switch representing the digit of least significance of said second chain as a pulse train to said control circuit, and means in said control circuit for causing said pulse train from the second chain to be summated with the pulse trains from said first chain, whereby said multiplicand is multiplied by said multiplier at the same time as said further number is added to the product of said multiplication, whereby multiplication and addition occur simultaneously.

5. An electrical information storage circuit which comprises first and second chains of series-connected gas-filled discharge tubes on each of which chains a binary number may be stored as a pattern of operated and unoperated tubes, an operated tube representing the binary digit one and an unoperated tube representing the binary digit zero, a pulse generator, connections from said pulse generator to the tubes of each of said chains in common by means of which step pulses are fed to said chains to cause any pattern of operated and unoperated tubes representing a binary number to be stepped as a whole, tube-by-tube, along the respective chains in the direction towards the tube representing the digit of least significance, a plurality of control devices each of which monitors the condition of a predetermined different one of a plurality of tubes of said first chain, a further control device which monitors the condition of the tube representing the digit of least significance of said second chain, equipment under control of all of said control devices and operable to generate a pulse train which represents a modification of the information stored in said first chain, the result of said modification being a pulse train which represents in binary code $(a \times b) + c$, where $c$ was stored in said second chain, $a$ was stored in said first chain, and $b$ is defined by the selection of the tubes of said first chain being monitored, a plurality of gate circuits so arranged that said control devices are operable to control said equipment singly and in turn, and a connection from said pulse generator to said equipment by means of which pulses are applied thereto in such a way that each said control device can be operated between the application to said chains of two successive step pulses.

6. A circuit as claimed in claim 5, and which comprises means for feeding said modified information element-by-element to the tube of said first chain representing the digit of greatest significance.

References Cited in the file of this patent

UNITED STATES PATENTS

| | | |
|---|---|---|
| 2,404,047 | Flory et al. | July 16, 1946 |
| 2,411,540 | Haigh | Nov. 26, 1946 |
| 2,429,227 | Herbst | Oct. 21, 1947 |
| 2,429,228 | Herbst | Oct. 21, 1947 |

OTHER REFERENCES

A Digital Computer for Scientific Applications; West and De Turk; "Proceedings of the I. R. E."; December 1948, pages 1452–1460.

"Progress Report (2) on the EDVAC"; Moore School of Electrical Engineering, University of Pennsylvania, June 30, 1946; Declassified February 17, 1947. (Pages 1–1–1 to 1–1–5, 1–1–7, 1–1–8 and 1–2–17 to 1–2–20, Figures PY–0–213, PY–0–105, and PY–0–212 relied upon.)